(12) United States Patent
Hong et al.

(10) Patent No.: US 11,383,331 B2
(45) Date of Patent: Jul. 12, 2022

(54) JIG FOR SPOT WELDING (71) Applicant: LG CHEM, LTD., Seoul (KR)

(72) Inventors: Dae-Ji Hong, Daejeon (KR); Kang-Il Lee, Daejeon (KR); Han-Jong Yoon, Daejeon (KR); Jae-Hun Yang, Daejeon (KR); Young-Bum Cho, Daejeon (KR); Hang-June Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 313 days.

(21) Appl. No.: 16/619,441

(22) PCT Filed: Feb. 11, 2019

(86) PCT No.: PCT/KR2019/001639
§ 371 (c)(1),
(2) Date: Dec. 4, 2019

(87) PCT Pub. No.: WO2019/156520
PCT Pub. Date: Aug. 15, 2019

(65) Prior Publication Data
US 2020/0147734 A1 May 14, 2020

(30) Foreign Application Priority Data

Feb. 12, 2018 (KR) .................. 10-2018-0017033

(51) Int. Cl.
*B23K 37/04* (2006.01)
*B23K 26/22* (2006.01)
(Continued)

(52) U.S. Cl.
CPC ........ *B23K 37/0426* (2013.01); *B23K 26/066* (2015.10); *B23K 26/22* (2013.01);
(Continued)

(58) Field of Classification Search
CPC .... B23K 26/22; B23K 26/066; B23K 26/037; B23K 37/0443; B23K 37/0426
See application file for complete search history.

(56) References Cited

U.S. PATENT DOCUMENTS

2014/0353293 A1\* 12/2014 Huonker ............. B23K 26/037
219/121.6
2015/0014395 A1 1/2015 Lu et al.
(Continued)

FOREIGN PATENT DOCUMENTS

CN 1266776 A 9/2000
CN 101418439 A 4/2009
(Continued)

OTHER PUBLICATIONS

International Search Report for PCT/KR2019/001639 (PCT/ISA/210) dated May 3, 2019.
(Continued)

*Primary Examiner* — Geoffrey S Evans
(74) *Attorney, Agent, or Firm* — Birch, Stewart, Kolasch & Birch, LLP (57) ABSTRACT

A spot welding jig is provided. The spot welding jig presses electrode leads of battery cells to be closely adhered onto a bus bar when spot welding is performed to the electrode leads interposed on the bus bar along a width direction of the electrode leads. The spot welding jig includes a passing portion through which a welding laser passes, and a predetermined number of barriers configured to vertically partition an inner space of the passing portion.

19 Claims, 9 Drawing Sheets

(51) Int. Cl.
  *B23K 26/066* (2014.01)
  *B23K 26/70* (2014.01)
  *H01M 50/502* (2021.01)
  *H01M 50/531* (2021.01)
  *B23K 101/36* (2006.01)

(52) U.S. Cl.
  CPC ........... *B23K 26/70* (2015.10); *H01M 50/502* (2021.01); *H01M 50/531* (2021.01); *B23K 2101/36* (2018.08)

(56) References Cited

U.S. PATENT DOCUMENTS

| | | | |
|---|---|---|---|
| 2018/0169790 A1 | 6/2018 | Jin et al. | |
| 2018/0245616 A1* | 8/2018 | Kumazawa | F16B 5/08 |
| 2020/0139486 A1* | 5/2020 | Shimazoe | H01M 8/0202 |

FOREIGN PATENT DOCUMENTS

| | | |
|---|---|---|
| CN | 202028851 U | 11/2011 |
| CN | 103212905 A | 7/2013 |
| CN | 203409430 U | 1/2014 |
| CN | 105070957 A | 11/2015 |
| CN | 206200366 U | 5/2017 |
| CN | 206717300 U | 12/2017 |
| JP | 07-211594 A | 8/1995 |
| JP | 11342421 A * | 12/1999 |
| JP | 2010-40261 A | 2/2010 |
| JP | 2014136254 A * | 7/2014 |
| JP | 2015-47625 A | 3/2015 |
| JP | 2016-30280 A | 3/2016 |
| KR | 10-0909188 B1 | 7/2009 |
| KR | 10-1023184 B1 | 3/2011 |
| KR | 10-2013-0049984 A | 5/2013 |
| KR | 10-2013-0131658 A | 12/2013 |
| KR | 10-2015-0125387 A | 11/2015 |
| KR | 10-2016-0104931 A | 9/2016 |
| KR | 10-2016-0109035 A | 9/2016 |
| KR | 10-1784573 B1 | 10/2017 |
| KR | 10-2017-0130091 A | 11/2017 |
| WO | WO 2012/077878 A1 | 6/2012 |

OTHER PUBLICATIONS

Liding Wang et al., Polymer Micro-Nanofabrication Technology, Nov. 30, 2012, 136-137 pages, Beijing: National Defense Industry Press.

Xiaoming Guan et al., Introduction to Electronic Skills Training, Aug. 31, 2016, 101 page, Beijing Institute of Technology Press.

* cited by examiner

JIG FOR SPOT WELDING

TECHNICAL FIELD

The present disclosure relates to a spot welding jig, and more particularly, to a spot welding jig capable of improving the welding quality when laser spot welding is performed to an electrode lead of a pouch-type secondary battery cell.

The present application claims priority to Korean Patent Application No. 10-2018-0017033 filed on Feb. 12, 2018 in the Republic of Korea, the disclosures of which are incorporated herein by reference.

BACKGROUND ART

Recently, secondary batteries have been widely used not only in small-sized devices such as portable electronic devices, but also in electric vehicles for securing a driving force by using internal combustion engines and/or electric motors. The electric vehicle includes a hybrid electric vehicle, a plug-in hybrid electric vehicle, and a pure electric vehicle powered by an electric motor and battery only without an internal combustion engine.

If a secondary battery is used in an electric vehicle, a battery module is constructed by connecting a large number of secondary batteries in series and/or in parallel to increase capacity and power. At this time, pouch-type secondary batteries are widely used for medium-sized or large-sized devices since because the pouch-type secondary batteries may be easily stacked.

Generally, the battery module adopts the laser welding method to electrically connect the secondary batteries. For example, as disclosed in Korean Unexamined Patent Publication No. 10-2013-0131658, secondary batteries are alternately stacked such that electrode leads of positive electrodes and negative electrodes are protruded at both ends thereof so that the electrode leads of the electrodes and the negative electrodes have opposite polarities. The electrode leads of the stacked secondary batteries are folded to overlap with each other, and the bent portions of the electrode leads are fused to each other by the laser output from a laser generator. At this time, the electrode leads may be fused by linear welding in which the electrode leads are continuously welded along the length direction at the connection portions of the electrode leads or by spot welding in which the electrode leads are discontinuously welded. Recently, the spot welding is more preferred since it is performed faster and gives less damage to the welding base metal, compared to the line welding.

Meanwhile, if the electrode leads are separated during the laser welding process, the adhesion may be deteriorated or holes may be created. As a solution to this problem, a welding jig is conventionally used to press the electrode leads on a bus bar so that the electrode leads are not separated. However, if the bent state of the electrode leads is incomplete to the bus bar or the assembled state of the bus bar is bad, the electrode leads may not be flatly pressed to the bus bar. In this case, the weld quality may be deteriorated due to the deteriorated adhesion caused by separation between the electrode leads and the bus bar or the creation of holes. In particular, in case of the spot welding, the adhesion of the periphery of each welding target region is important, but the conventional welding jig does not reflect this.

DISCLOSURE

Technical Problem

The present disclosure is designed to solve the problems of the related art, and therefore the present disclosure is directed to providing a spot welding jig, which has a structure capable of improving a welding quality by maintaining the adhesion of electrode leads when spot welding is performed.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a spot welding jig to press electrode leads of battery cells onto a bus bar to perform spot welding on the electrode leads along a width direction of the electrode leads, the spot welding jig comprising: a passing portion having an inner space to allow a welding laser to pass therethrough; and a predetermined number of barriers vertically partitioning the inner space of the passing portion into a plurality of partitioned spaces.

The passing portion may include a first passing portion and a second passing portion. The spot welding jig may further comprise a jig body including the first passing portion at a lower end thereof; and a welding guide block including the second passing portion extending from an upper end of the welding guide block to a lower end of the welding guide block coupled to the lower end of the jig body such that the second passing portion is in communication with the first passing portion, and the barriers may be provided in the second passing portion.

The plurality of barriers may extend to a bottom surface of the welding guide block.

The welding guide block may be detachably connected to the jig body.

A pair of hooking protrusions may be provided at one of opposite side surfaces of the jig body or the welding guide block, and a pair of hooking groove may be provided to another of the opposite side surfaces of the jig body or the welding guide block to be coupled with the pair of hooking protrusions.

The spot welding jig may further comprise a pair of connecting rods provided at opposite edges of an upper surface of the jig body, the pair of connecting rods being configured to connect the jig body to a laser generator body, each connecting rod may include a support rod arranged to extend normal to the upper surface of the jig body, a coil spring wound around the support rod; and a pressing rod connected to the support rod, the pressing rod being configured to translate along the support rod.

The welding guide block may have a relatively smaller thickness than the jig body.

The spot welding jig may further comprise a mask provided to a bottom end of the jig body and having a blocking portion for absorbing the welding laser and a pattern portion for allowing the welding laser to pass.

The pattern portion may have a plurality of tornado or spiral shaped patterns.

In another aspect of the present disclosure, there is also provided a laser welding device, which comprises the spot welding jig described above and a laser generator, the laser generator being configured to provide a laser to pass through the passing portion.

In another aspect of the present disclosure, there is also provided a method of welding electrode leads of battery cells onto a bus bar, which includes arranging the electrode leads on the bus bar, using the spot welding jig described above to press the passing portion against the electrode leads, and applying a welding laser through each partitioned space of the plurality of partitioned spaces to provide a plurality of welds along a width direction of the electrode leads.

Advantageous Effects

According to an embodiment of the present disclosure, it is possible to provide a spot welding jig, which has a structure capable of improving a welding quality by maintaining the adhesion of electrode leads when spot welding is performed.

The electrode lead welding jig may not only maintain the adhesion of the electrode leads at the periphery of the spot welding patterns around the respective spot welding patterns, but also prevent interference caused by foreign substances such as spatters since the space for performing the spot welding is partitioned.

The effects of the present disclosure are not limited to the above, and other effects not mentioned herein will be clearly understood by those skilled in the art from the specification and the accompanying drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A spot welding jig 10 explained below may mean, for example, a jig that plays a role of pressing electrode leads 21 to be closely adhered onto a bus bar 31 when spot welding is performed to the bus bar 31 by bending one end of the electrode leads 21 of pouch-type battery cells 20. However, the spot welding jig 10 according to the present disclosure may also be used between different welding base metals which need to be closely adhered when spot welding is performed, in addition to the electrode leads 21 of the pouch-type battery cells 20.

The welding jig 10 according to the present disclosure may include a passing portion 110, 210 formed in a hollow structure so that a laser may pass therethrough, and a predetermined number of barriers 220 for vertically partitioning the passing portion 110, 210.

As explained later in more detail, the welding jig 10 according to the present disclosure may guide the welding laser to be irradiated to a designated location on the electrode lead 21 through the passing portion 110, 210, secure the adhesion around the welding base metal during spot welding, and protect surrounding spot welding areas in the event of spatter, thereby contributing to improving spot welding quality.

Figure 1:
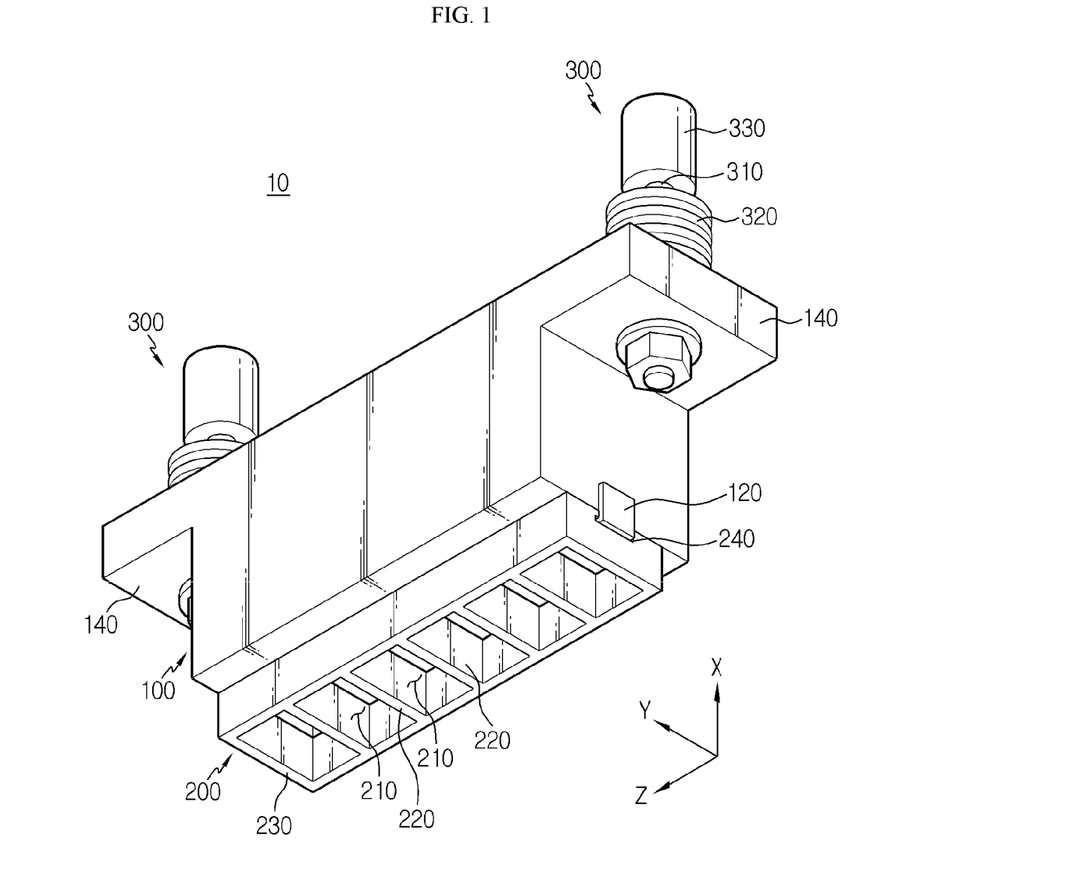
FIG. 1 is a perspective view showing a spot welding jig according to an embodiment of the present disclosure, observed from the below.
Figure 2:
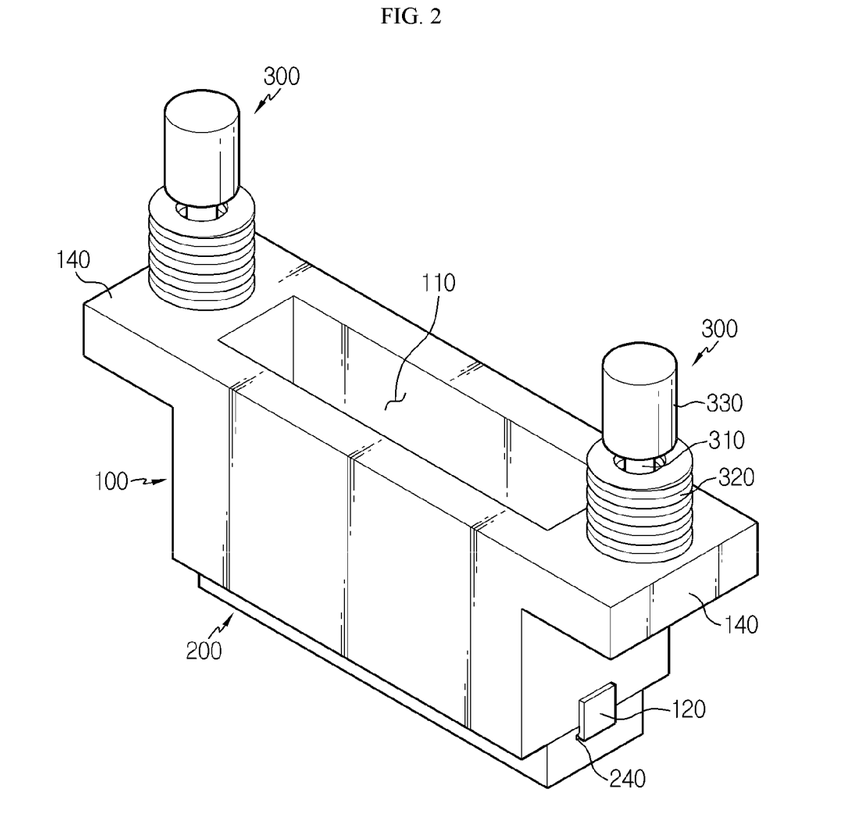
FIG. 2 is a perspective view showing the spot welding jig of FIG. 1, observed from the above.
Figure 3:
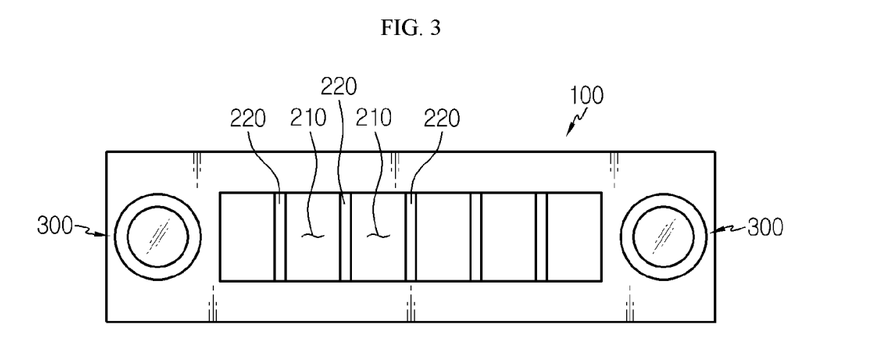
FIG. 3 is a plane view showing the spot welding jig of FIG. 1.
Figure 4:
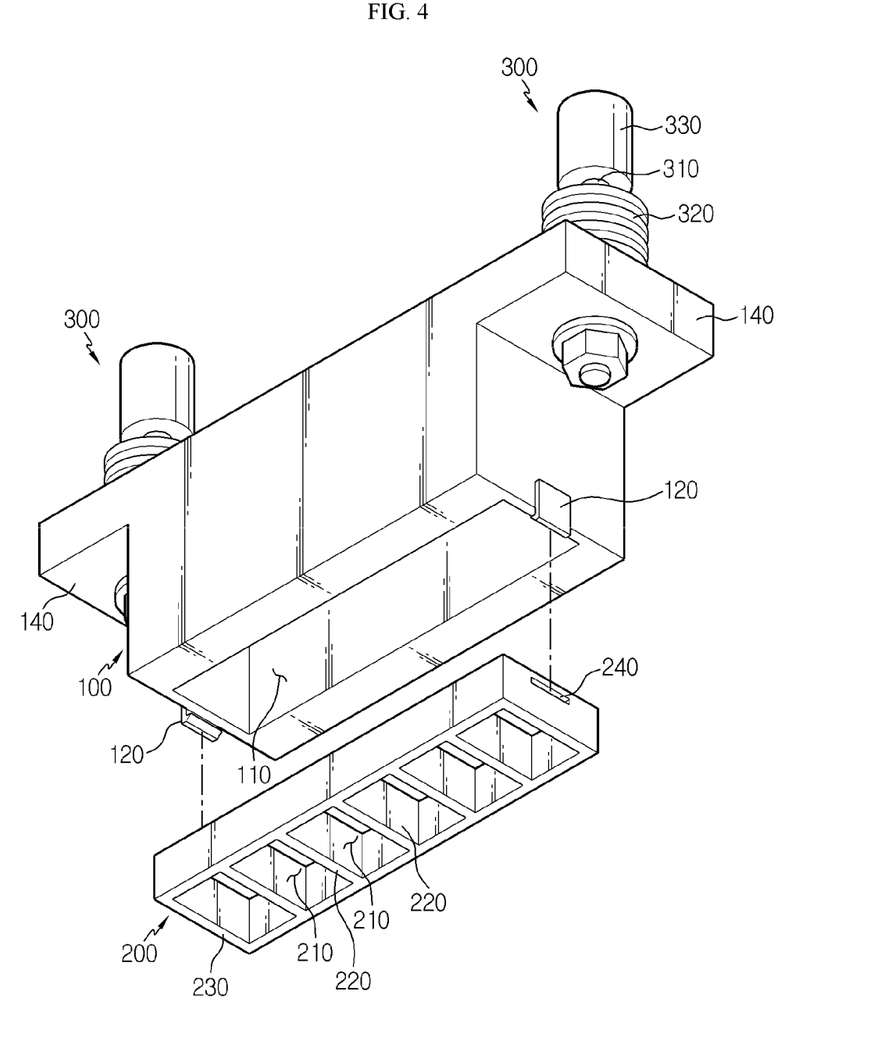
FIG. 4 is a partially exploded perspective view showing the spot welding jig according to an embodiment of the present disclosure.

FIG. 1 is a perspective view showing the spot welding jig 10 according to an embodiment of the present disclosure, observed from the below, FIG. 2 is a perspective view showing the spot welding jig 10 of FIG. 1, observed from the above, FIG. 3 is a plane view showing the spot welding jig 10 of FIG. 1, and FIG. 4 is a partially exploded perspective view showing the spot welding jig 10 according to an embodiment of the present disclosure.

The welding jig 10 according to an embodiment of the present disclosure having the passing portion 110, 210 and the plurality of the barriers 220 will be described in more detail with reference to the above figures. The welding jig 10 may include a jig body 100, a welding guide block 200 positioned below the jig body 100, and a connecting rod 300 supporting the jig body 100 and connecting the jig body 100 to a laser generator body (not shown).

The jig body 100 may be made of a rectangular metal block having a predetermined thickness. The jig body 100 has a first passing portion 110 hollowed therein, and the connecting rod 300, which may be connected to the laser generator body, may be assembled on upper surfaces of both end portions of the jig body 100 in the length direction.

The first passing portion 110 is a portion through which the welding laser passes, and may be in the form of an elongated hole corresponding to the width of the electrode lead 21 to be welded.

The first passing portion 110 communicates with a second passing portion 210 provided in the welding guide block 200. Thus, the laser may pass through the first passing portion 110 and the second passing portion 210 in turn. In this embodiment, the barrier 220 is provided only in the second passing portion 210, among the first passing portion 110 and the second passing portion 210.

By applying the barrier 220 only to the second passing portion 210, when the electrode lead 21 is to be linearly welded to the bus bar 31, the linear welding may be performed using only the jig body in a state where the welding guide block 200 is separated.

The welding guide block 200 is configured to contact the electrode leads 21 to closely adhere the electrode leads 21 onto the bus bar 31. The welding guide block 200 has a top end coupled to a lower portion of the jig body 100, and a bottom end sized corresponding to the bus bar 31 and the second passing portion 210 communicating with the first passing portion 110. Here, the bottom end may function as a pressing surface 230 that comes into contact with the electrode lead.

In addition, the welding guide block 200 may be formed relatively thinner than the jig body 100. That is, the welding guide block 200 may have a slim design to have a width corresponding to the width of the bus bar 31, and the jig body 100 may be made thicker than the welding guide block 200 to secure installation of the connecting rod 300 and structural robustness thereof.

The space in the second passing portion 210 may be vertically partitioned by the predetermined number of the barrier 220. For example, as shown in FIGS. 1 and 3, the inner space of the second passing portion 210 may be partitioned into six spaces as five barriers 220 are installed therein at regular intervals along the width direction (the Z-axis direction) of the electrode leads 21 where spot welding is to be performed. The welding laser may be sequentially irradiated onto the welding surface of the electrode lead 21 through the six partitioned spaces.

Figure 7:
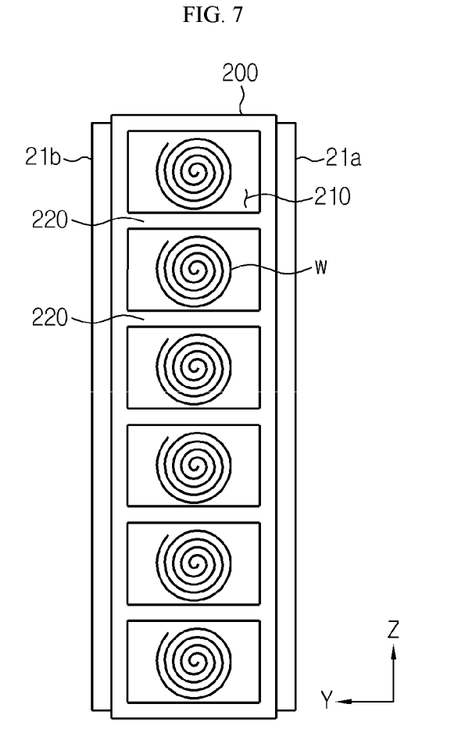
FIG. 7 is a diagram showing electrode leads to which tornado spot welding is performed in a state where the electrode leads are closely adhered to a welding guide block according to an embodiment of the present disclosure.

The five barriers 220 extend to a bottom end of the welding guide block 200, namely to the pressing surface 230 that comes into in contact with the electrode leads 21. According to this configuration, as shown in FIG. 7, the electrode leads 21a, 21b superimposed on the bus bar may be pressed not only in the first direction (the Z-axis direction) parallel to the direction in which the spot welding is performed but also in the second direction (the Y-axis direction) intersecting the first direction. In other words, as the welding surface of the electrode lead 21 is pressed in a lattice form, the perimeter around a (tornado) spot welding pattern W may be closely adhered. In addition, since the (tornado) spot welding is performed in the spaces respectively partitioned by the barriers 220, foreign substances such as spatter which may be generated during the spot welding process may be prevented from splashing around, thereby improving the welding quality.

Meanwhile, the welding guide block 200 may be detachably provided to the jig body 100.

That is, as shown in FIG. 4, the welding guide block 200 may be mounted to or dismounted from the jig body 100 in a snap-fitting manner, thereby allowing replacement at any time.

For example, a hooking protrusion 120 may be provided to any one of both side surfaces of the jig body 100 and both side surfaces of the welding guide block 200, and a hooking groove 240 may be provided to the other thereof to be coupled with the hooking protrusion 120. In this embodiment, the hooking protrusion 120 is provided to both side surfaces of the jig body 100 one by one, and the hooking groove is provided to both side surfaces of the welding guide block 200 one by one. Here, the present disclosure is not limited to the detachment configuration of this embodiment but may adopt any configuration that allows the welding guide block 200 to be easily attached to and detached from the jig body 100.

Figure 8:
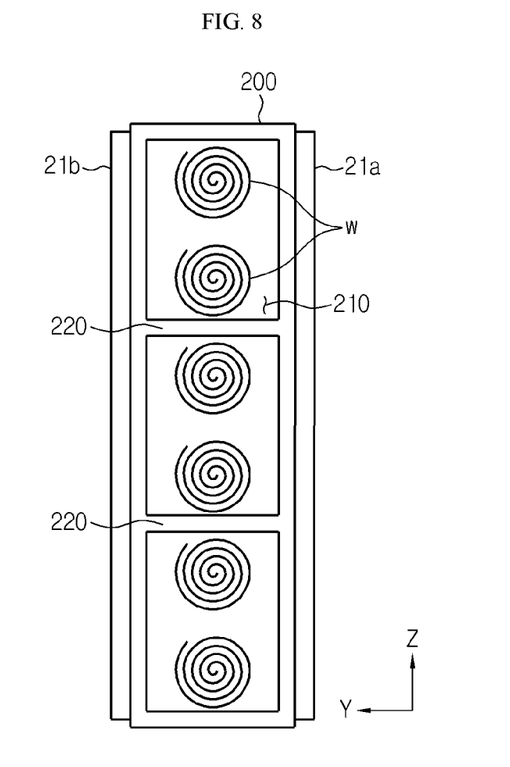
FIG. 8 shows a modified example of FIG. 7 according to an embodiment of the present disclosure.

If the welding guide block 200 is configured to be replaceable with respect to the jig body 100 as described above, various compatible welding guide blocks 200 of various forms may be attached to the jig body 100. For example, as shown in FIG. 8, a welding guide block 200 having two barriers 220 in the second passing portion 210 may be attached to the jig body 100 so that (tornado) spot welding is performed to two patterns at a time in one partitioned space. In addition, although not shown in the drawing, a welding guide block 200 having no barrier 220 may be attached to the second passing portion 210 to perform line welding, or a welding guide block 200 having a different size may be attached to the jig body 100 to be used for an electrode lead 21 having a different size from this embodiment. In addition, if the welding guide block 200 is damaged while the welding jig 10 is in use, the welding jig 10 may be used normally if the welding guide block 200 is replaced with a new one. Thus, it is not required to discard the entire product, thereby reducing the loss, compared to a case where the welding guide block 200 is fabricated integrally.

The connecting rod 300 is configured to connect the jig body 100 to the laser generator body (not shown) and apply an elastic force to the jig body 100 and the welding guide block 200 connected thereto.

Figure 6:
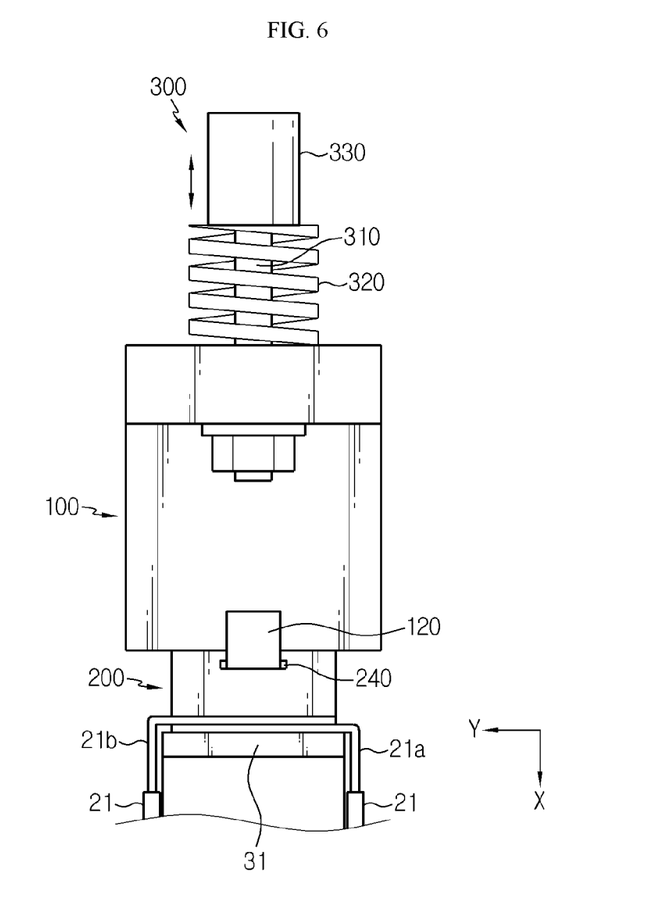

Referring to FIG. 6 along with FIGS. 1 and 2, in the connecting rod 300 of this embodiment, the connecting rod 300 is provided in a pair, and the pair of connecting rods 300 are provided at the both edges of the top end of the jig body 100, one by one. In addition, the connecting rod 300 includes a support rod 310 extending vertically at the top end of the jig body 100 in a state where a coil spring 320 is interposed around the support rod 310, and a pressing rod 330 connected to the support rod 310 to be capable of translating along the length direction of the support rod 310. Thus, the coil spring 320 may be compressed or uncompressed when the pressing rod 330 translates relative to the support rod 320.

The jig body 100 may have a wing portion 140 formed to extend in both side directions at the top end from the body at which the first passing portion 110 is formed. The wing portion 140 serves as a place where the connecting rod 300 may be installed.

The support rod 310 may have a threaded one end fixed to a lower surface of the wing portion 140 with a nut, and the remaining portion of the support rod 310 may pass through the wing portion 140 to be disposed perpendicular to the wing portion 140. The coil spring 320 may be interposed around the support rod 310 and disposed on the upper surface of the wing portion 140.

The pressing rod 330 has a cylindrical shape with an insert hole into which the support rod 310 may be inserted, and the other end of the support rod 310 has a greater size than the insert hole to prevent the pressing rod 330 and the support rod 310 from being separated from each other.

Meanwhile, although not shown in the figures, one side of the pressing rod 330 may be connected to the laser generator body. Thus, the welding jig 10 may be moved in the upper, lower, left and right directions or rotated in the forward or rearward direction in association with the laser generator body.

The connecting rod 300 may provide an elastic force for closely adhering the electrode leads 21 and the bus bar 31 by means of the coil spring 320. Thus, even though the bending state of the electrode leads 21 to the bus bar 31 is incomplete or the assembled state of the bus bar 31 is somewhat bad, the welding surfaces of the electrode leads 21 may be closely adhered to the bus bar 31 in parallel, thereby effectively solving the separation between the electrode leads 21 and the bus bar 31.

Hereinafter, an example of using the spot welding jig 10 according to this embodiment will be briefly described with reference to FIGS. 5 to 7.

The battery module is configured by connecting a number of secondary batteries connected in series and/or in parallel in order to increase capacity and power. At this time, the pouch-type secondary battery 20 may be used as the secondary battery since pouch-type secondary batteries may be easily stacked. An interconnection board (ICB) assembly 30 including a plurality of bus bars 31 may be attached to front and rear surfaces of the stacked secondary batteries, and the electrode leads 21 of the secondary batteries may be connected to the bus bar 31 disposed at the front surface through slots of the ICB assembly 30. The secondary batteries may be welded on the bus bar 31 by laser spot welding and electrically connected thereto. The spot welding jig 10 of the present disclosure is used to prevent separation between electrode leads 21 of the secondary batteries and the bus bars 31 during the laser spot welding and to guide the laser irradiation range.

Figure 5:
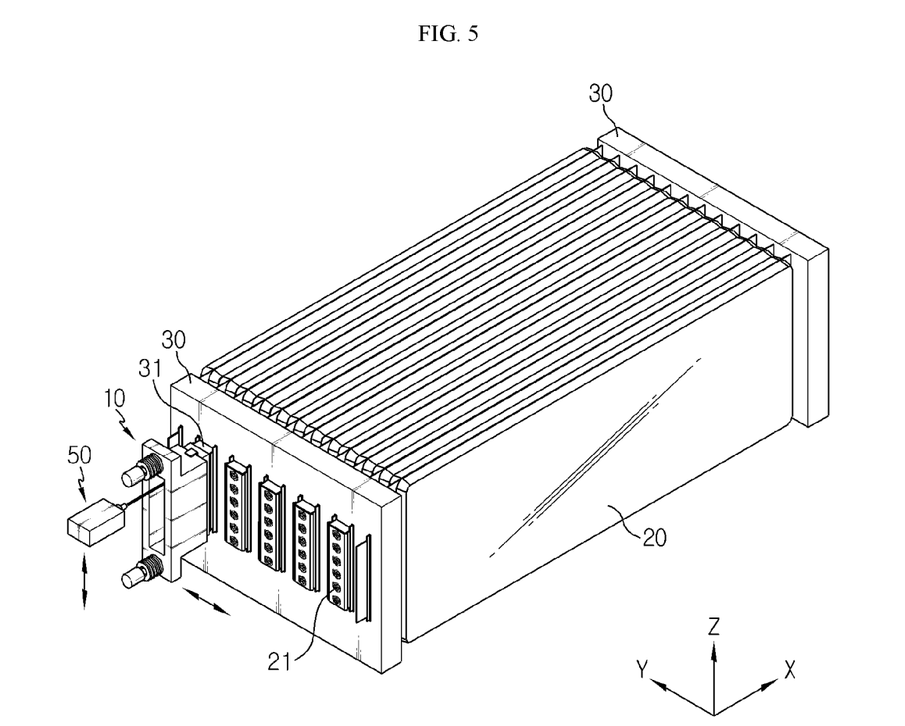
FIGS. 5 and 6 are respectively a perspective view and a cross-sectioned view showing an example of using the spot welding jig according to an embodiment of the present disclosure.

If the laser generator moves up, down, left and right and is loaded on the welding portion of the battery module as shown in FIG. 5, the electrode leads 21a, 21b interposed as the welding jig 10 is bent are closely adhered onto the bus bar 31 as shown in FIG. 6. After that, the welding laser passes through the first passing portion 110 of the jig body 100 and the second passing portion 210 of the welding guide block 200 in turn to perform spot welding on the welding surface of the electrode lead 21. Here, the spot welding may be tornado spot welding as shown in FIG. 7. The tornado spot welding has a wider welding area than the ordinary spot welding, thereby securing excellent weld strength and easy depth adjustment. For this reason, the welded material hardly scatters or punctures.

If the tornado spot welding is completely performed to one point, the laser generator 50 is moved to a position corresponding to the next spot welding point partitioned by the barriers 220 and irradiates the laser to form a tornado pattern W.

At this time, as described above, the spot welding spots are partitioned by the welding guide block 200, and the peripheries thereof are individually pressed, so that the spot welding may be performed in a closely adhered state. Accordingly, the tornado patterns W may be clearly formed at accurate positions without any separation of the electrode lead 21 and the bus bar 31 or any interference by spatter.

Next, a welding jig 10 according to another embodiment of the present disclosure will be explained with reference to FIGS. 9 and 10. The same reference numerals as in the former embodiment designate the same components. The same components will not be explained again, and features different from the former embodiment will be mainly described.

Figure 9:
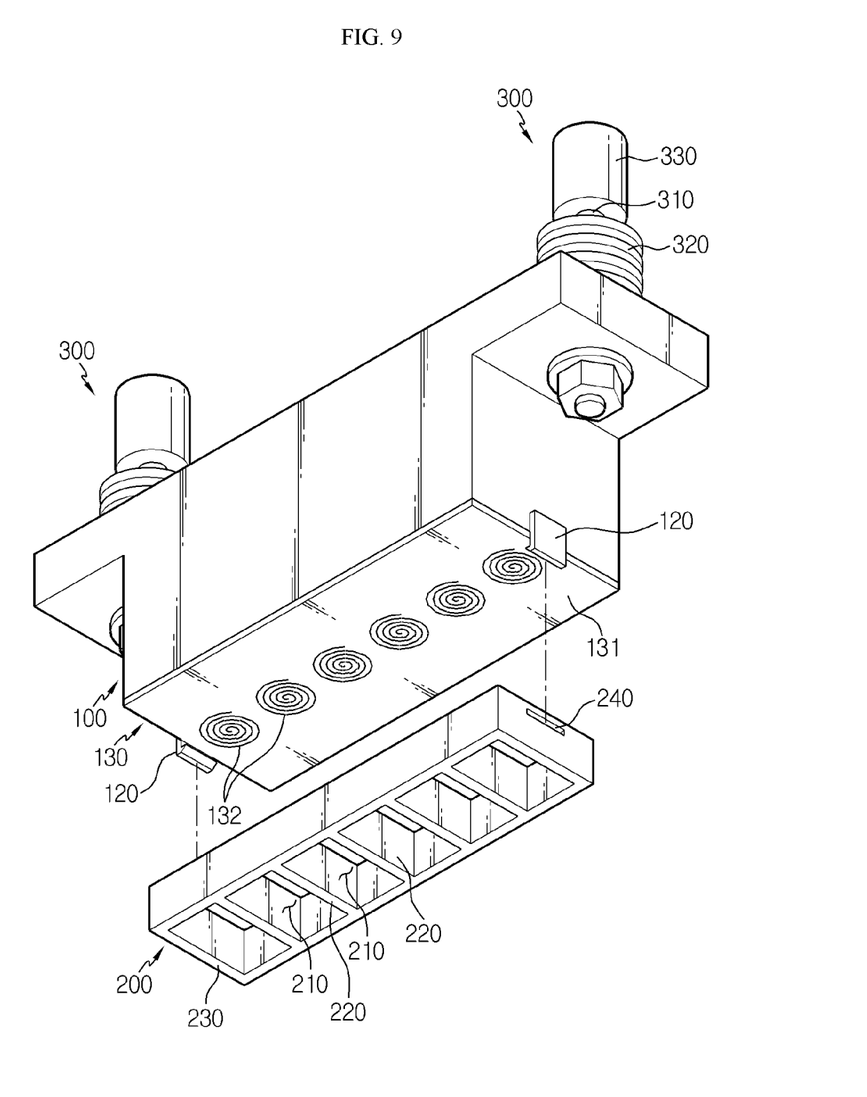
FIG. 9 is a partially exploded perspective view showing a spot welding jig according to another embodiment of the present disclosure.
Figure 10:
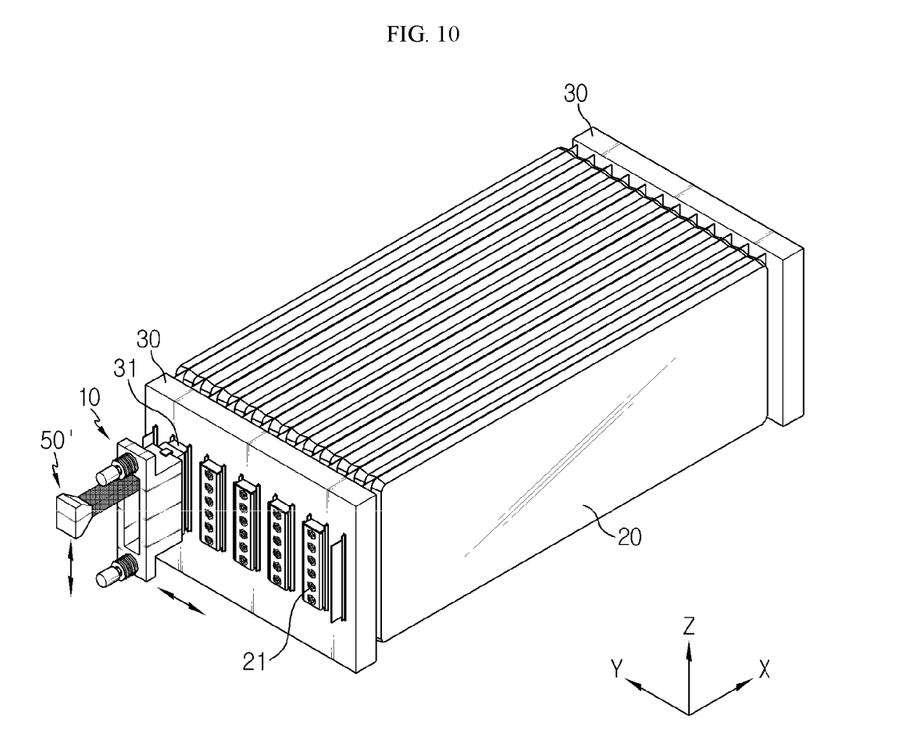
FIG. 10 is a diagram showing an example of using the spot welding jig according to another embodiment of the present disclosure.

FIG. 9 is a partially exploded perspective view showing a spot welding jig 10 for welding the electrode lead 21 according to another embodiment of the present disclosure, and FIG. 10 is a diagram showing the spot welding jig 10 for welding the electrode lead 21 according to another embodiment of the present disclosure.

The welding jig 10 according to another embodiment of the present disclosure further includes a mask 130 for forming the tornado pattern more easily and quickly than the former embodiment. The mask 130 is a light control means for selectively blocking or reflecting the laser output from a laser generator 50'.

In this embodiment, the mask 130 may be provided at the bottom end of the jig body 100 and may include a laser blocking portion 131 for absorbing the laser and a pattern portion 132 for allowing the laser to pass.

The laser blocking portion 131 is a portion that prevents the laser from being irradiated to the welding surface of the electrode lead 21 during laser welding. The laser blocking portion 131 is made of a material capable of absorbing the laser, for example, a plastic material such as a heat-resistant resin, a material used as a laser shield plate for complete laser absorption, or a metal such as chromium.

The pattern portion 132 is a portion having openings so that the laser may be irradiated to the welding surface of the electrode lead 21 in a desired form. For example, in this embodiment, a plurality of pattern portions 132 are provided in the form of a tornado pattern, and the plurality of pattern portions 132 are located in six partitioned areas of the second passage portion of the welding guide block 200 in one-to-one relationship. However, the present disclosure is not limited to the pattern portion 132 formed in a tornado pattern. That is, the pattern portion 132 may be determined according to a desired welding width and a desired welding length.

If the welding jig 10 having the mask 130 is used, the laser incident into the first passing portion 110 may selectively pass through the pattern portion 132 and be irradiated onto the welding surface of the electrode lead 21 through the second passing portion 210. Thus, as shown in FIG. 10, if the laser having a predetermined width is irradiated to the first passing portion 110 of the spot welding jig 10' in a scanning manner, the electrode lead 21 may be fused to the bus bar 31 in a desired tornado pattern.

If the spot welding jig 10 according to this embodiment is used as described above, the spot welding in the form of a tornado pattern may be performed just by irradiating the laser of a predetermined width to the first passing portion 110 by a scanning method, thereby greatly shortening the time required for performing the spot welding.

Meanwhile, even though the mask 130 is designed to configure the lower surface of the jig body 100 in this embodiment, in an alternative embodiment, it is also possible that the mask 130 is provided at the top end of the welding guide block 200 or the mask 130 may be provided as a separate component to be mounted between the jig body 100 and the welding guide block 200. In this case, the mask 130 may be replaced more easily.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A spot welding jig to press electrode leads of battery cells onto a bus bar to perform spot welding on the electrode leads along a width direction of the electrode leads, the spot welding jig comprising:
   a jig body including a first passing portion at a lower end thereof, and
   a welding guiding block including a second passing portion from an upper end of the welding guide block to a lower end of the welding guide block, the upper end of the welding guide block being coupled to the lower portion of the jig body such that the second passing portion is in communication with the first passing portion,
   wherein the first passing portion and the second passing portion define an inner space to allow a laser beam to pass therethrough,
   wherein the welding guide block include a predetermined number of barriers vertically partitioning the inner space of the passing portion into a plurality of partitioned spaces in the second passing portion, and
   wherein the welding guide block has a relatively smaller thickness than the jig body.

2. The spot welding jig according to claim 1, wherein the plurality of barriers extend to a bottom surface of the welding guide block.

3. The spot welding jig according to claim 1, wherein the welding guide block is detachably connected to the jig body.

4. The spot welding jig according to claim 3, wherein a pair of hooking protrusions are provided at one of opposite side surfaces of the jig body or the welding guide block, and
   wherein a pair of hooking grooves are provided at another of the opposite side surfaces of the jig body or the welding guide block to be coupled with the pair of hooking protrusions.

5. The spot welding jig according to claim 1, further comprising:
   a pair of connecting rods provided at opposite edges of an upper surface of the jig body, the pair of connecting rods being configured to connect the jig body to a laser generator body, each connecting rod including:
      a support rod arranged to extend normal to the upper surface of the jig body;
      a coil spring wound around the support rod; and
      a pressing rod connected to the support rod, the pressing rod being configured to translate along the support rod.

6. The spot welding jig according to claim 1, further comprising:
   a mask provided at a bottom surface of the lower end of the jig body; the mask including a blocking portion configured to absorb the laser bean and a pattern portion configured to allow the laser beam to pass therethrough.

7. The spot welding jig according to claim 6, wherein the pattern portion has a plurality of spiral shaped patterns.

8. A laser welding device, comprising:
   the spot welding jig according to claim 1; and
   a laser generator, the laser generator configured to provide a laser beam to pass through the passing portion.

9. A method of welding electrode leads of battery cells onto a bus bar, the method comprising:
   arranging the electrode leads on the bus bar;
   using the spot welding jig of claim 1 to press the passing portion against the electrode leads; and
   applying a laser beam through each partitioned space of the plurality of partitioned spaces to provide a plurality of welds along a width direction of the electrode leads.

10. A spot welding jig to press electrode leads of battery cells onto a bus bar to perform spot welding on the electrode leads along a width direction of the electrode leads, the spot welding jig comprising:
    a jig body including a first passing portion at a lower end thereof;
    a welding guiding block including a second passing portion from an upper end of the welding guide block to a lower end of the welding guide block, the upper end of the welding guide block being coupled to the lower portion of the jig body such that the second passing portion is in communication with the first passing portion; and
    a mask provided at a bottom surface of the lower end of the jig body; the mask including a blocking portion configured to absorb a laser beam and a pattern portion configured to allow the laser beam to pass therethrough,
    wherein the first passing portion and the second passing portion define an inner space to allow the laser beam to pass therethrough, and
    wherein the welding guide block include a predetermined number of barriers vertically partitioning the inner space of the passing portion into a plurality of partitioned spaces in the second passing portion.

11. A laser welding device, comprising:
    the spot welding jig according to claim 10; and
    a laser generator, the laser generator configured to provide a laser beam to pass through the passing portion.

12. A method of welding electrode leads of battery cells onto a bus bar, the method comprising:
    arranging the electrode leads on the bus bar;
    using the spot welding jig of claim 10 to press the passing portion against the electrode leads; and
    applying a laser through each partitioned space of the plurality of partitioned spaces to provide a plurality of welds along a width direction of the electrode leads.

13. A spot welding jig to press electrode leads of battery cells onto a bus bar to perform spot welding on the electrode leads along a width direction of the electrode leads, the spot welding jig comprising:
    a jig body including a first passing portion at a lower end thereof; and
    a welding guiding block including a second passing portion from an upper end of the welding guide block to a lower end of the welding guide block, the upper end of the welding guide block being coupled to the lower portion of the jig body such that the second passing portion is in communication with the first passing portion,
    wherein the first passing portion and the second passing portion define an inner space to allow a laser beam to pass therethrough,
    wherein the welding guide block include a predetermined number of barriers vertically partitioning the inner space of the passing portion into a plurality of partitioned spaces in the second passing portion,
    wherein a pair of hooking protrusions are provided at one of opposite side surfaces of the jig body or the welding guide block, and
    wherein a pair of hooking grooves are provided at another of the opposite side surfaces of the jig body or the welding guide block to be coupled with the pair of hooking protrusions.

14. A laser welding device, comprising:
the spot welding jig according to claim 13; and
a laser generator, the laser generator configured to provide a laser beam to pass through the passing portion.

15. A method of welding electrode leads of battery cells onto a bus bar, the method comprising:
arranging the electrode leads on the bus bar;
using the spot welding jig of claim 13 to press the passing portion against the electrode leads; and
applying a laser through each partitioned space of the plurality of partitioned spaces to provide a plurality of welds along a width direction of the electrode leads.

16. A spot welding jig to press electrode leads of battery cells onto a bus bar to perform spot welding on the electrode leads along a width direction of the electrode leads, the spot welding jig comprising:
a jig body including a first passing portion at a lower end thereof;
a welding guiding block including a second passing portion from an upper end of the welding guide block to a lower end of the welding guide block, the upper end of the welding guide block being coupled to the lower portion of the jig body such that the second passing portion is in communication with the first passing portion;
a pair of connecting rods provided at opposite edges of an upper surface of the jig body, the pair of connecting rods being configured to connect the jig body to a laser generator body,
wherein the first passing portion and the second passing portion define an inner space to allow a laser beam to pass therethrough, and
wherein the welding guide block include a predetermined number of barriers vertically partitioning the inner space of the passing portion into a plurality of partitioned spaces in the second passing portion.

17. The spot welding jig according to claim 16, wherein each connecting rod includes:
a support rod arranged to extend normal to the upper surface of the jig body;
a coil spring wound around the support rod; and
a pressing rod connected to the support rod, the pressing rod being configured to translate along the support rod.

18. A laser welding device, comprising:
the spot welding jig according to claim 17; and
a laser generator, the laser generator configured to provide a laser beam to pass through the passing portion.

19. A method of welding electrode leads of battery cells onto a bus bar, the method comprising:
arranging the electrode leads on the bus bar;
using the spot welding jig of claim 17 to press the passing portion against the electrode leads; and
applying a laser through each partitioned space of the plurality of partitioned spaces to provide a plurality of welds along a width direction of the electrode leads.

\* \* \* \* \*